UNITED STATES PATENT OFFICE.

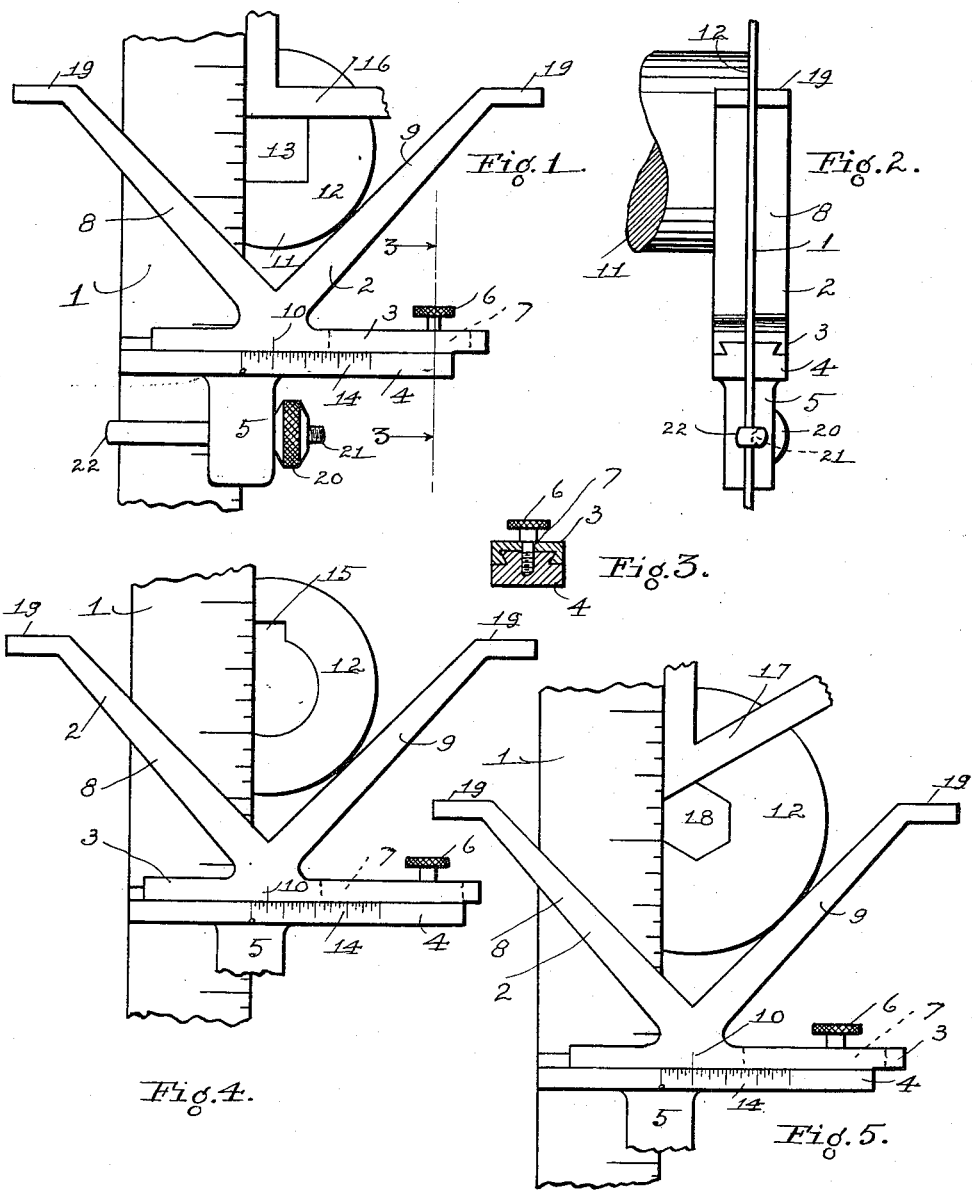

ABRAHAM VERWYS, OF GRAND RAPIDS, MICHIGAN.

MECHANIC'S GAGE.

1,296,720.            Specification of Letters Patent.    Patented Mar. 11, 1919.

Application filed June 3, 1918. Serial No. 237,939.

*To all whom it may concern:*

Be it known that I, ABRAHAM VERWYS, a citizen of the United States, residing at Grand Rapids, in the county of Kent and State of Michigan, have invented new and useful Improvements in Mechanics' Gages, of which the following is a specification.

The present invention relates to mechanics' gages, and its object is to provide an improved gage whereby keyways, shaft-receiving bores and the like may be positioned centrally in wheels, gears and other mechanical elements.

This object is attained by, and the invention finds preferable embodiment in, the device hereinafter described and illustrated by the accompanying drawings, in which:—

Figure 1 is a front view of a mechanic's gage;

Fig. 2 is a side view thereof;

Fig. 3 is a cross section of certain parts taken on line 3—3 of Fig. 1;

Fig. 4 and Fig. 5 are views similar to Fig. 1, but showing somewhat different uses of the gage.

In the embodiment of the invention chosen for illustration by the drawings and for detailed description in the body of this specification, I provide a rule 1 and a work-holder 2 connected therewith in such manner that the work-holder may be moved in a direction transverse to the rule to desired adjustment, and thereupon secured in such adjustment. In said embodiment, the work-holder is thus movable in a slideway (see Fig. 3) formed by the dovetailing base 3 of the work-holder and arm 4 of the work-holder's support 5. A headed screw 6 passing through a slot 7 longitudinally disposed through the base 3 is threaded in the arm 4, whereby the work-holder may be securely clamped in adjusted position relatively to the rule. In said embodiment, the work-holder has two arms 8, 9, diverging oppositely and at equal angles from any line parallel with the rule, such line passing through the indicator point or line 10 of the work-holder, which line intersects the meeting point of the interior surfaces of the arms 8, 9. The work, as a cylindrical body 11, is placed in the work-holder (see Fig. 1), its curved side resting on the inner surfaces of the arms 8, 9, the end or face 12 of the work (which is transverse to its axis) abutting against one side of the rule, as particularly shown in Fig. 2.

If it is desired to mark out a half inch square opening 13 to be cut in the center of the cylindrical body (as for the purpose of receiving a shaft), the work-holder is moved away from the rule one-quarter of an inch as measured by the indicator 10 registering with the proper graduation on the graduated scale 14 of the arm 4 and is secured in that position by turning down the screw 6. The face of the work may now be marked along the edge of the rule, which is in usable position or relation to said face, as shown in Fig. 1. The work may now be turned a quarter way around, which position may be determined by bringing the marked line into registry with the square 16 and the work may be now marked along the edge of the rule; another quarter turn in the same manner will define a third line, which is parallel with the first line marked on the work; and a third quarter turn will define the fourth side of the square 13 centrally located in the face of the work.

The indicator point 10 registers with the zero point of the graduated scale 14 when the position of the work-holder is such that the rule's edge intersects the center of the work.

A keyway 15, having sides each of which is parallel with a diameter of the work, may be marked out in a similar way, as shown in Fig. 4. A square 16 may be laid against the rule as shown in Fig. 1, so that lines may be marked on the work's face at right angles to the rule, and an angle 17 of sixty degrees may be thus laid against the rule in order to mark out a hexagon 18 on the work's face as shown in Fig. 5.

The work-holder may be provided with a shelf 19 at right-angles to the rule, so that a straight-edge may be laid on the shelf for marking lines on the work's face perpendicular to the rule.

The rule itself may be graduated as shown, and the support 5 may be arranged to slide along the rule and be clamped in position as by the nut 20 threaded on the bolt 21 whose end 22 hooks around the opposite edge of the rule, as shown.

It will be seen that, inasmuch as the work-holder is cleft longitudinally, thus extending on both sides of the rule, (see Fig. 2), either side of the gage may be applied to the work.

The invention being intended to be pointed out in the claims, is not to be limited to or by details of construction shown or described.

I claim:—

1. In a device of the character described; a rule; a work-holder extending on both sides of the rule and movable transversely to the rule; and means for securing the rule and the work-holder interrelatively; the work-holder being adapted to permit the rotation of the work on its axis, and the rule being in usable relation to the face of the work transverse to its axis.

2. In a device of the character described; a rule; a work-holder extending on both sides of the rule and movable transversely to the rule; and means for securing the rule and the work-holder interrelatively; the work-holder having arms diverging oppositely and at equal angles from a line parallel with the rule, such arms being adapted to permit the rotation of the work held therebetween on its axis, and the rule being in usable relation to the face of the work transverse to its axis.

3. In a device of the character described; a rule; a work-holder extending on both sides of the rule and movable transversely to the rule; a graduated scale for measuring the separation of the rule and the work-holder and carried in connection with one of them; and means for securing the rule and the work-holder interrelatively; the work-holder being adapted to permit the rotation of the work on its axis, and the rule being in usable relation to the face of the work transverse to its axis.

4. In a device of the character described; a rule; a work-holder extending on both sides of the rule and movable transversely to the rule; and means for securing the rule and the work-holder interrelatively; the work-holder having a shelf at right-angles to the rule, and being adapted to permit the rotation of the work on its axis, and the rule being in usable relation to the face of the work transverse to its axis.

5. In a device of the character described; a rule; a work-holder extending on both sides of the rule and movable transversely to the rule; a graduated scale for measuring the separation of the rule and the work-holder and carried in connection with one of them; and means for securing the rule and the work-holder interrelatively; the rule being in usable relation to the face of the work transverse to its axis, and the work-holder being adapted to permit the rotation of the work on its axis and having arms adapted to hold the work therebetween with its center in registration with the rule when the work-holder registers with the zero position of the graduated scale.

In testimony whereof I have hereunto set my hand at Grand Rapids, Michigan, this 31st day of May, 1918.

ABRAHAM VERWYS.